United States Patent [19]

Banbury

[11] Patent Number: 5,646,783

[45] Date of Patent: Jul. 8, 1997

[54] HELMET-MOUNTED OPTICAL SYSTEMS

[75] Inventor: John R. Banbury, Fleet, United Kingdom

[73] Assignee: The Secretary of State for Defence in Her Britannic Majesty's Government of the United Kingdom of Great Britain and Northern Ireland, Farnborough, United Kingdom

[21] Appl. No.: 374,711

[22] PCT Filed: Jul. 8, 1993

[86] PCT No.: PCT/GB93/01434

§ 371 Date: Jan. 26, 1995

§ 102(e) Date: Jan. 26, 1995

[87] PCT Pub. No.: WO94/01798

PCT Pub. Date: Jan. 20, 1994

[30] Foreign Application Priority Data

Jul. 14, 1992 [GB] United Kingdom .................. 9214909

[51] Int. Cl.$^6$ .................................................. G02B 27/14
[52] U.S. Cl. ........................................... 359/630; 359/634
[58] Field of Search ..................................... 359/630, 631, 359/632, 633, 634

[56] References Cited

U.S. PATENT DOCUMENTS 4,028,725  6/1977  Lewis .................................. 358/103
4,361,384  11/1982  Bosserman ........................ 350/174
5,257,094  10/1993  LaRussa ............................. 359/13

FOREIGN PATENT DOCUMENTS

| 011024 | 5/1980 | European Pat. Off. | ........ G02B 27/00 |
| 399865 | 11/1990 | European Pat. Off. | ........ G02B 27/00 |
| 2665267 | 1/1992 | France | ........................... G02B 23/10 |
| 2182159 | 5/1987 | United Kingdom . | |

*Primary Examiner*—Georgia Y. Epps
*Assistant Examiner*—Thomas Robbins
*Attorney, Agent, or Firm*—Nixon & Vanderhye, P.C.

[57] ABSTRACT

An optical system mounted on a helmet (29) for superimposing a collimated image of a display object on the external view of the helmet's wearer comprising: display object means (1a, 1b) mounted on the helmet for generating a display; a concave collimator (6a, 6b) for collimating light from said display; an optical relay unit (3a, 3b) located in the forehead region for generating an intermediate image of said display in the focal plane of the collimator; a reflecting surface (4a, 4b) for reflecting display light from the relay unit towards the collimator; and an inclined combiner (5) essentially transparent to incoming display light and to the wearer's external view, for reflecting display light reflected from the collimator towards the viewer's eye.

20 Claims, 10 Drawing Sheets

HELMET-MOUNTED OPTICAL SYSTEMS

BACKGROUND OF THE INVENTION

1. Field of the Invention

This invention relates to compact optical systems, especially to portable optical systems adapted to project images across the wearer's field of view. The invention has particular, but not exclusive, application to the provision of head-up display images for aircrew, and provides a means by which an optical system may be employed to convert an image provided by a small cathode ray tube (CRT), matrix array or other light source (typically mounted on the flying helmet) into a collimated, head-up form suitable for the display of information. Other possible applications of the invention are in connection with military and high-performance vehicles.

2. Discussion of Prior Art

There is an increasing need for this provision in both fixed and rotary-wing aircraft, the information to be displayed being required to complement the electronic display facilities installed in the aircraft cockpit. Whilst any presentation of information in a head-up format (in accordance with established criteria) will enhance operator performance, a particularly useful facility provided by head-mounted displays would be the display of information superimposed over the viewer's outside view in whatever direction the viewer's head was pointing.

Unfortunately, severe inertia and volume constraints are placed on the provision of equipment supported on the human neck, and in this respect particularly strict limits are imposed for fast-jet applications where a need for greater head freedom compounds difficulties already aggravated by the effects of high-g manoeuvres. Other requirements, essential for fast-jet operation, such as the provision of safe ejection and birdstrike protection, are not needed in rotary wing operations which are restricted to a much smaller flight envelope with no requirement for emergency ejection (in the same sense). For the latter applications it is therefore relatively straightforward to supply more facilities and to achieve a higher technical performance.

Nevertheless for all these applications there is a demand for maximum performance for the minimum size and weight, and this invention is intended to provide apparatus which is physically acceptable and can provide a good optical performance and range of facilities.

Certain proposals have been made for projecting a head-up display from helmet-mounted components, such as those described in EP-A-11,024, and for the design of individual components, such as eye position sensors as described in EP-A-408,344, but hitherto no proposal has been made for a system which effectively integrates the optical components in a way which meets the requirements set out above.

SUMMARY OF THE INVENTION

This invention accordingly consists of an optical system mounted on a helmet for superimposing a collimated image of a display object on the external view of the helmet's wearer characterised by:

display object means mounted on the helmet for generating a display;

a collimator having the function of a concave mirror for collimating light from said display;

an optical relay unit located in the forehead region for generating an intermediate image of said display in the focal plane of the collimator;

a reflecting surface for reflecting display light from the relay unit towards the collimator;

and an inclined combiner, essentially transparent to incoming display light and to the wearer's external view, for reflecting display light reflected from the collimator towards the viewer's eye;

the collimator being located away from the wearer's external view through the combiner and being located on the opposite side of the said external view with respect to the optical relay unit.

The collimator may be used axially but to take advantage of the diffractive properties of the combiner a quasi-axial configuration is preferred.

The system preferably includes at least one additional reflecting surface to enable the display object means, which might for example be the screen of a CRT or an NVG image intensifier, to be mounted in a convenient location such as on the side of the helmet. One or more such reflecting surfaces may also be provided to give the head-up image the correct orientation if necessary.

Additional reflecting surfaces may also be provided to enable the images on two different display object means to be superimposed; these surfaces may incorporate partially reflecting mirrors or prisms.

The system may incorporate an eye sensor for detecting the direction in which the viewer's eyes are pointing.

The system may operate in a monocular configuration but it may be adapted for binocular operation by the additional provision of a second unit which is essentially a mirror image of the first.

In one form of the invention when used as a binocular system, the combiner takes the form of a single planar sheet of material, appropriate areas of which can operate as a combiner for the separate optical paths serving the left and right eyes respectively. Such a single combiner can serve as a substantially rigid platform on or to which the respective collimators and other reflecting surfaces may be mounted.

BRIEF DESCRIPTION OF THE DRAWINGS

By way of example, a number of embodiments of the invention will now be described with reference to the drawings, of which

DETAILED DESCRIPTION OF PREFERRED EMBODIMENTS

In describing embodiments which take the form of a single-channel display system it should be understood that in practice two essentially symmetrical systems will normally be provided to form a binocular system.

Figure 1:
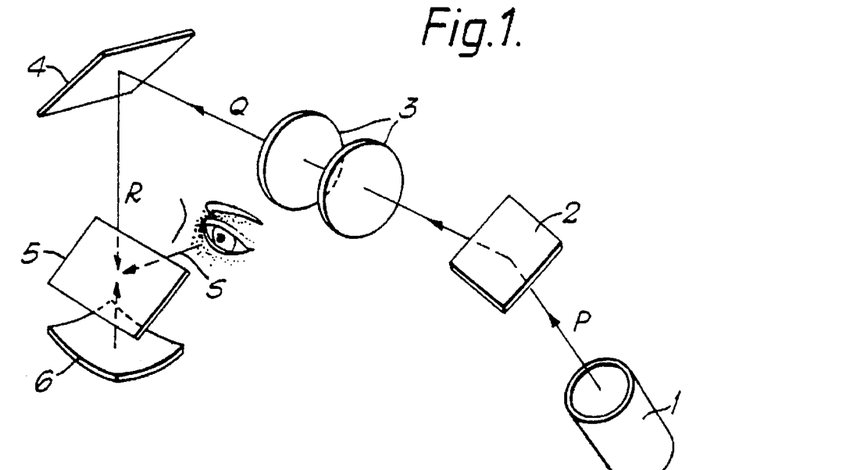
FIG. 1 is a schematic perspective view of the main optical components of a single-channel helmet-mounted head-up display system constructed in accordance with the invention.

With reference to FIG. 1, the system consists of a miniature CRT 1 mounted on the side of a helmet (not shown), the optical axis of which impinges on an oblique planar mirror 2 before passing transversely generally across the forehead region through a relay lens unit 3. The axis is folded downwards at a second planar mirror 4 towards and through a combiner 5 and hence to a concave collimator 6. The optical axis then passes upwards again and is reflected at the combiner towards the wearer's eye. In FIG. 1 the discrete sections of the optical axis are designated P, Q, R and S.

In this basic design as used for a wide-field display compatible with an integrated helmet system, the sections Q and R of the optical axis are normally orthogonal. The angle between P and Q may be greater than 90° to take account of the amount by which overall head width exceeds forehead width. A downward tilt of section P improves the weight distribution of the system and places the CRT 1 in a convenient position relative to the helmet shell.

The angle between the sections R and S is determined by the relative orientation of the combiner 5 and the collimator 6. For the present purpose, optical design need not be constrained for accurate image orientation or for full cancellation of geometrical distortion: rotation and alignment of the visible image can be achieved at the CRT screen and a reasonable amount (up to about 15%) of electronic image correction is feasible before variation of image resolution across the field of view becomes significant.

Figure 2A:
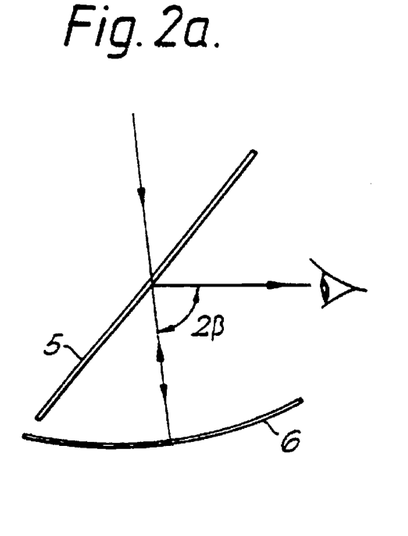
FIGS. 2a, 2b and 2c are respectively diagrammatic cross-sections of three possible configurations of the collimator/combiner of the above system illustrating the path of the optical axis.
Figure 2B:
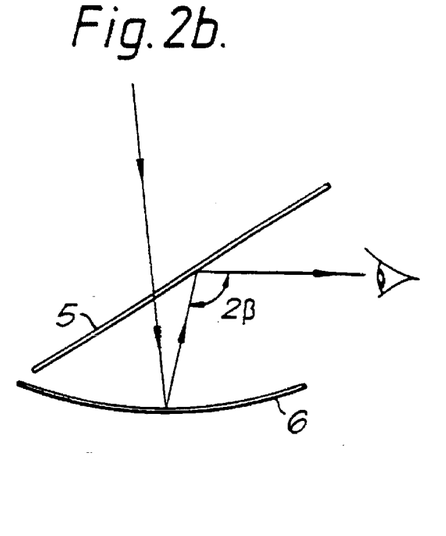
Figures 2C, 2D:
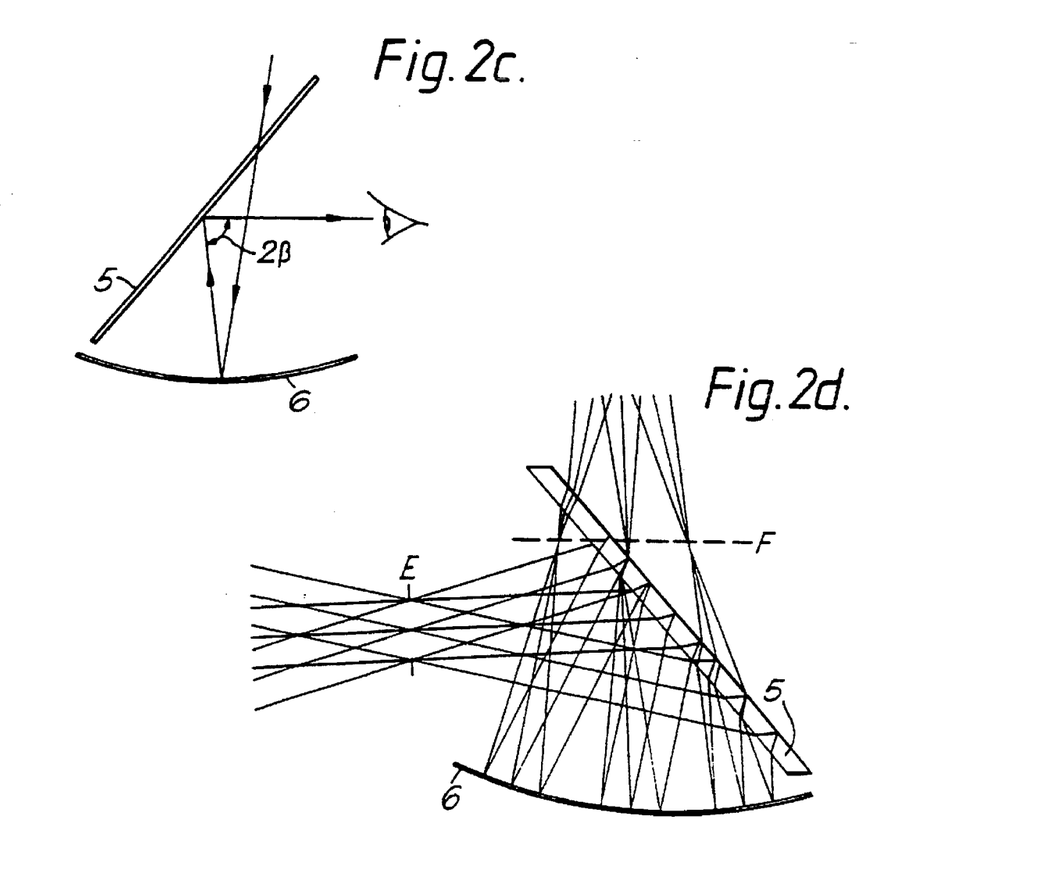
FIG. 2d is a similar cross-section, equivalent to FIG. 2c, showing a number of ray traces.

A number of alternative configurations of the combiner/collimator are possible, and three such configurations, using the diffractive properties of a diffractive combiner, are illustrated in FIGS. 2a, 2b and 2c. FIG. 2a illustrates an "axial" arrangement, in which the optical axis is normal to the collimator 6 and parallel light from the collimator is incident at an angle β to the normal at the combiner 5. In an "orthogonal" system, 2β=90° so that display light incident on the combiner is normal to light reflected off the combiner towards the viewer.

FIGS. 2b and 2c illustrate "quasi-axial" arrangements, in which the optical axis is at a small angle to the normal of the collimator. By this means, the differential reflecting properties of the diffractive combiner can be exploited without introducing excessive aberrations due to asymmetrical reflection at the collimator. The main difference between FIG. 2b and 2c configurations, relate to the required direction of the input display light, and hence the physical interaction of the optical system with the helmet and other equipment. In practice the FIG. 2c configuration is preferred for the present application.

It should be noted that these quasi-axial arrangements, which are similar to the "Z-HUD" system described, for example, in GB-A-2182159, possess the advantages inherent in such an arrangement such as clarity, very low distortion in transmission, low optical aberrations and effective sunlight rejection. Naturally, the "axis-blocking" mirror of the conventional Z-HUD system is configured obliquely to form the second mirror 4 in order to accept light from the relay lens unit 3 (FIG. 1).

For reasons similar to those pertinent to the Z-HUD, the axial configuration is the one in which axis-blocking against sunlight can be most effectively achieved, whilst the FIG. 2b and 2c configurations are photometrically more efficient.

FIG. 2d shows in greater detail a number of ray traces through a quasi-axial collimator/combiner arrangement, equivalent to the configuration illustrated in FIG. 2c, as employed in this embodiment. After passing through the relay lens unit 3, the light from the CRT is focused along a curved focal surface F in the vicinity of the combiner 5. Care needs to be taken when designing the optics to ensure that the exit pupil E is properly located and of a sufficiently large diameter to accommodate small relative head movements without unduly sacrificing the field of view of the display.

Figure 3:
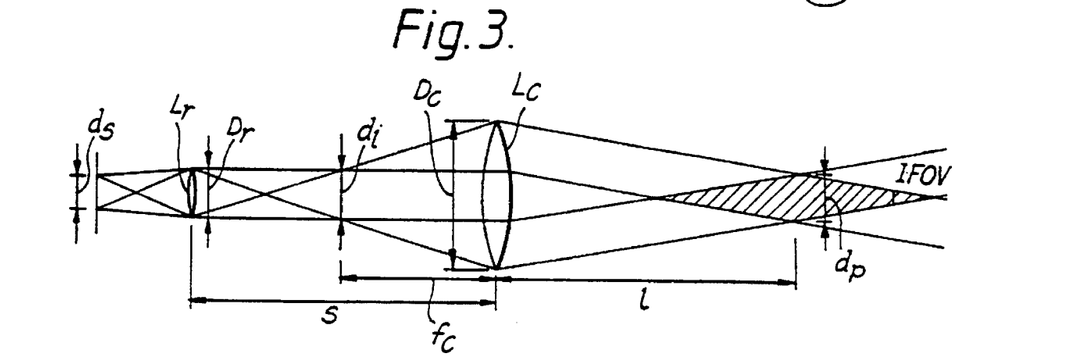
FIG. 3 is a schematic axial diagram of the entire optical system indicating a number of parameters which relate to the system performance.

In the use of a relay lens system for the production of a wide field collimated display, two relay magnification parameters, indicated in FIG. 3, are relevant:

1. Intermediate image magnification $d_i/d_s$ and
2. Exit pupil/relay lens diameter $d_p/D_r$.

(FIG. 3 is a simplified, linear representation of the optical system in which, for the purpose of understanding only, the collimator is represented by a lens instead of a mirror)

The intermediate image magnification determines the object size which will be required for a given field of view, when the collimator focal length has been chosen to suit the exit pupil and relay lens locations. The selection of a particular collimator/combiner geometry determines the minimum exit pupil clearance required from the collimator along the central display axis. The focal length of the collimator is typically in the range of 40 mm to 45 mm approximately.

The size of exit pupil achievable with a given relay lens diameter is of paramount importance for a head-mounted display. The weight of the largest elements in this lens will be related to the cube of the diameter, and obstruction of external view is substantially dependent on the physical size of the relay system, including the mirrors 2 and 4. It is therefore especially advantageous for $d_p/D_r$ to be as large as possible.

For different wide field displays, the choice of collimator/combiner assembly has a significant effect on the parameter $d_p/D_r$, which can vary typically from less than 0.4 up to 1.0 approximately. Whereas off-axis mirror display systems would have values of this parameter typically in the range of 0.4 to 0.45, the present configurations have a value typically above 0.75. A considerable weight reduction is hence made possible for a given exit pupil diameter.

System weight for a given performance is also influenced by the choice of relay lens; specific designs vary in the number and thickness of optical elements required. Therefore it is likely that the present invention will employ smaller and lighter elements in the relay lens compared with an equivalent off-axis system. A smaller relay lens will also of course reduce obscuration of the outside world.

Whereas a conventional head-up display would employ glass optical elements, the location of this assembly close to the eye directs that a plastic material such as polycarbonate should be used for the collimator and the combiner. Due to their small size, elements made of this material should possess a satisfactory mechanical rigidity; as an alternative, a plastic plus glass laminated construction may be used.

Figure 4A:
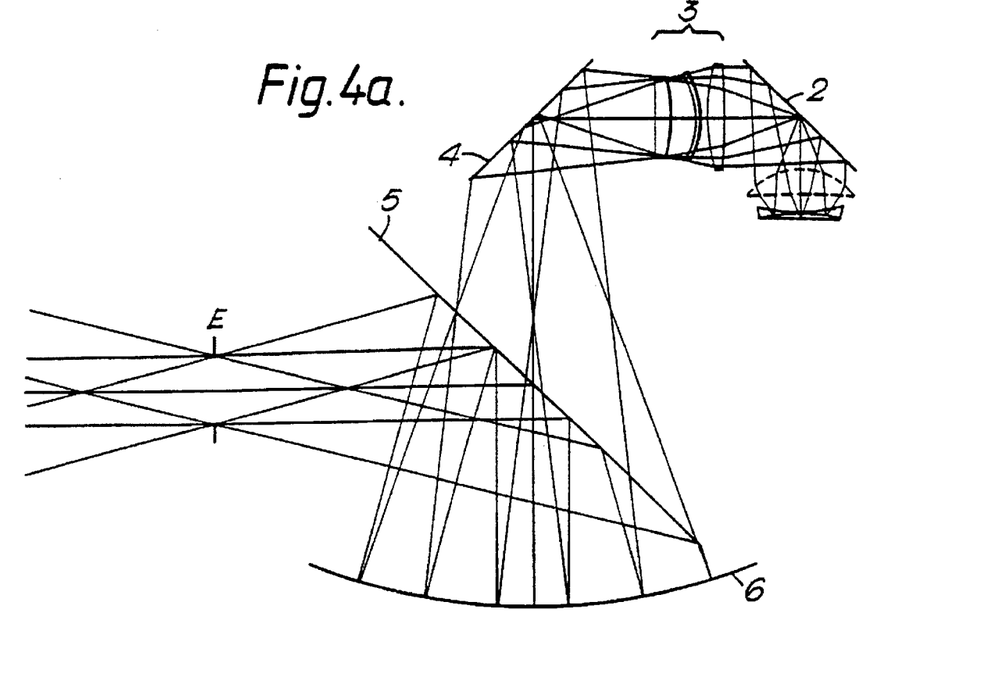
FIGS. 4a and 4b are respectively a two-dimensional diagram and a perspective diagram showing a number of ray traces through the optical components of the entire system.
Figure 4B:
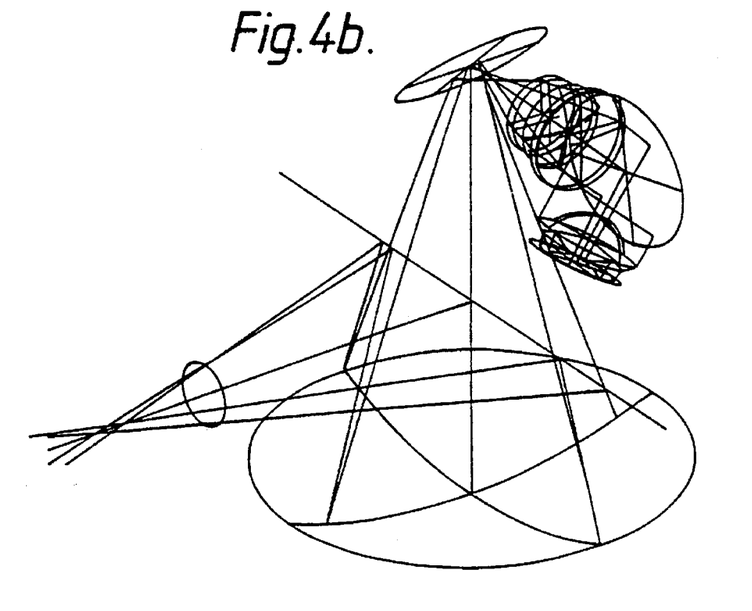

The schematic ray diagrams in FIGS. 4a and 4b are based on an axial system (as distinct from a quasi-axial one) but show the performance which can be achieved using this technique. For clarity, FIG. 4a shows the system in a single plane with two 90° folds; the axial spacing between the mirrors 2 and 4 is 37 mm. FIG. 4b shows the same system in three dimensions (for the right eye), and the limit rays shown are ±20° in azimuth and ±15° in elevation.

This example has a 10 mm unvignetted exit pupil with 45 mm eye relief along the central axis and 30° field in elevation from a CRT object height of 8.25 mm. Azimuth field is 40° and the corresponding CRT screen diameter is 11 mm. At the relay lens plane conjugate with the 10 mm exit pupil, the rays have a diameter of 12 mm, giving a ratio $d_p/D_r$ of 0.83. This high value ensures low mass for the optical system and minimum obscuration of upward view. In a binocular system, using opposite-hand folds at the upper mirror, the upward view from one eye will cover the small field obscured by the relay lens for the other eye.

In cases where the orientation of the source display is correct for direct viewing but not receptive to electronic reversing or inversion (such as, for example, for certain proprietary equipment such as night vision goggle (NVG) apparatus, then one or more additional mirrors may need to be incorporated into the system. Three variants of an embodiment in this form are illustrated in FIGS. 5, 6 and 7.

Figures 5, 6:
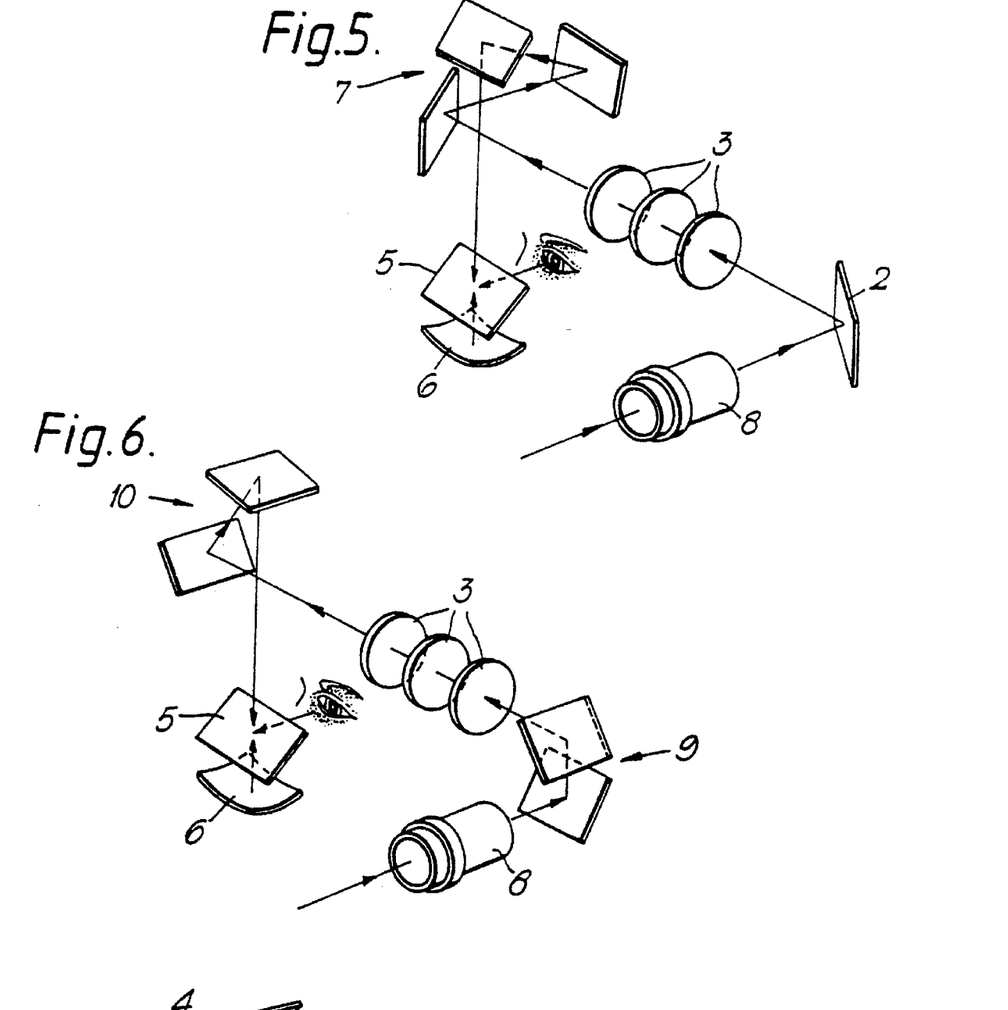
FIGS. 5, 6 and 7 are schematic perspective views showing respectively three alternative configurations in which additional mirrors are employed for image rectification.

In the FIG. 5 variant, a triple mirror arrangement 7 is provided to replace the second planar, single mirror 4 of the FIG. 1 embodiment. By this means, the image from the intensifier tube 8 of NVG apparatus undergoes the necessary inversions to appear in the correct orientation to the wearer.

In the FIG. 6 variant, the planar, single mirrors 2 and 4 of the FIG. 1 embodiment are each replaced by a double mirror arrangement 9 and 10 respectively.

Figure 7:
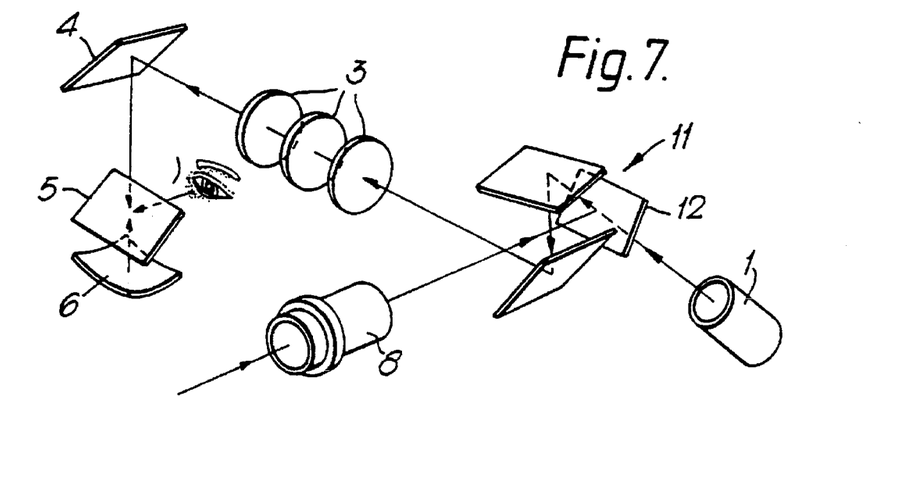

In another variant using the same principle, illustrated in FIG. 7, a facility is provided for the superimposition of collimated images from the display and from NVG apparatus by optical mixing of two independent sources.

In this variant, the first planar, single mirror of the FIG. 1 embodiment is replaced by a triple mirror arrangement 11 of which one element 12 is adapted to function as a combiner for the light from a CRT 1 and an NVG image intensifier 8.

It will be apparent that with appropriate adaptation of one element of the first mirror combination 9, the FIG. 6 variant can also provide for the superimposition of superimposed, collimated images.

All three variants provide advantages in optical performance and rejection of unwanted external light, with a good combination of field, exit pupil, eye relief and low aberrations, and provide scope for some adjustment of the image intensifier height with respect to eye level. Correct orientation of the mixed images is achieved without using fibre optic image rotators, which cause a significant addition to weight, path length and binocular disparity.

One comparative feature of the three variants is that in the triple, double and single second mirror arrangements the distance between the relay lens unit 3 and the focus of the collimator 6, and hence the magnification of the relay lens unit, progressively decreases. Which variant is selected depends on the relative importance of the main requirements, primarily mechanical, of the system, it being a basic requirement in all cases to provide a specific minimum field of view (for example 40° to 50° diagonal, with 40° azimuth by 30° elevation)—smaller fields, though easier to achieve and resulting in lower overall weight, are not of interest in an NVG application.

In practice, additional lenses are likely to be required, for example for field flattening purposes or to render the output from different sources optically compatible with one another.

The following examples illustrate some requirements which might need to be met by the system:

1. a specific eye relief, for example for extra NBC hood clearance;
2. a large image intensifier tube, for maximum NVG angular resolution;
3. a specific minimum relay lens diameter, for maximum upward peripheral vision.

In the first example, a relatively large collimator/ combiner assembly is required to meet the field of view criterion and there will be a weight problem if the imposed clearance is excessive. A collimated image is needed together with a correctly placed exit pupil of adequate size, but there is limited scope for a choice of relay lens position, which in turn constrains the choice of collimator focal length. The variants of either FIG. 5 or FIG. 6 may be appropriate according to the detailed dimensions.

The second example is an opposite requirement in which a longer path from the relay lens centre to the image intensifier screen is required to meet the optical criteria; thus the variant of FIG. 7 is more suitable.

The third example requires minimum bulk in the relay lens as a priority. The existence of a minimum practical dimension for the exit pupil volume implies a need for the most favourable magnification ratio between the system exit pupil diameter and the limiting aperture of the relay lens. For this purpose the FIG. 6 or FIG. 7 variant could be appropriate.

For fast-jet operation, the FIG. 7 variant is preferred for providing a compact, lightweight solution with the smallest convenient combiner dimensions, adequate eye relief for NBC hood clearance, a relay lens which gives the least obstruction of peripheral vision and a CRT which can be tilted at a convenient angle below the ear. This system would also accommodate a larger (eg 25 mm diameter) NVG tube, if needed for improved imaging performance at all but the lowest light levels.

In practice, the image intensifier in all three variants would be located close to the adjacent mirror assembly, but allowing if required space for a field flattening element in the detailed optical design. The lateral spacing between eye-line boresight and the optical axis of the intensifier tube is typically 50 mm to 60 mm. The detailed design must of course achieve a 1:1 scaling over the full field of view to ensure good correlation between directly viewed external objects and their intensified images.

It should be mentioned that for optimum performance, a narrow-band phosphor is required for the intensified image, with a higher photometric output than is needed in direct-view NVGs.

Figures 8, 9:
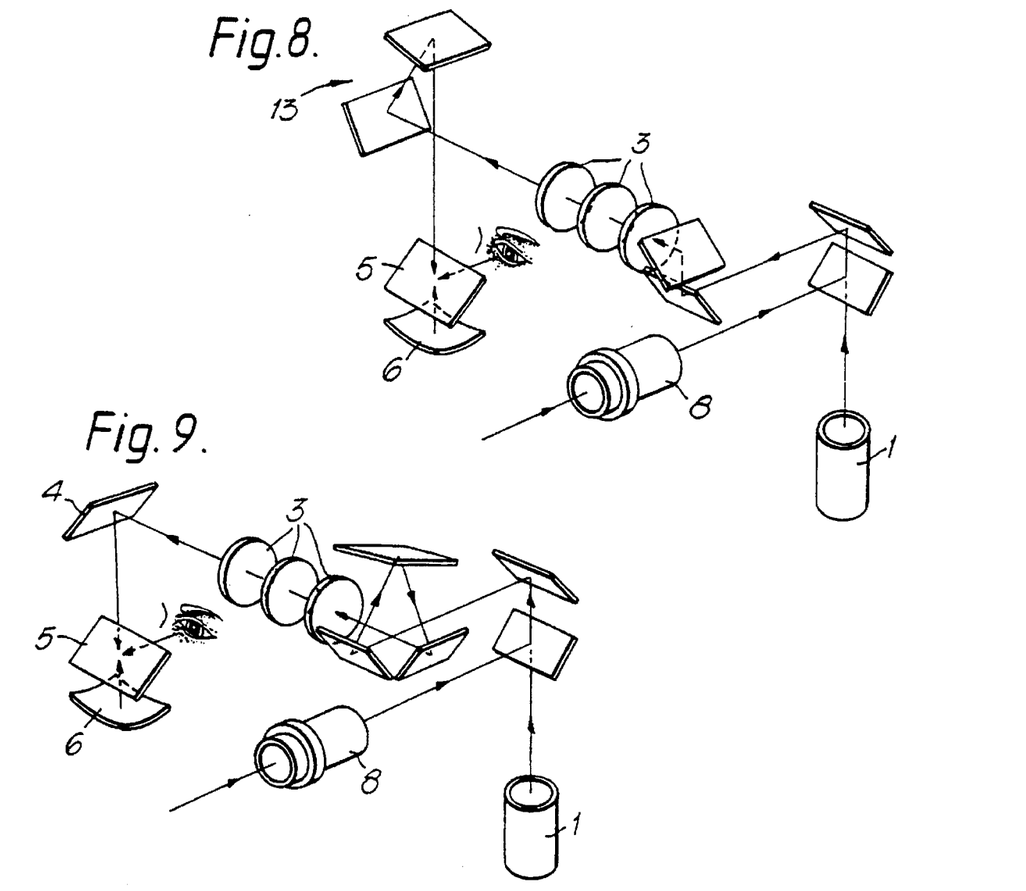
FIGS. 8, 9 and 10 are similar schematic perspective views of alternative configurations in which the forward protrusion of integrated NVGs is minimised.
Figure 10:
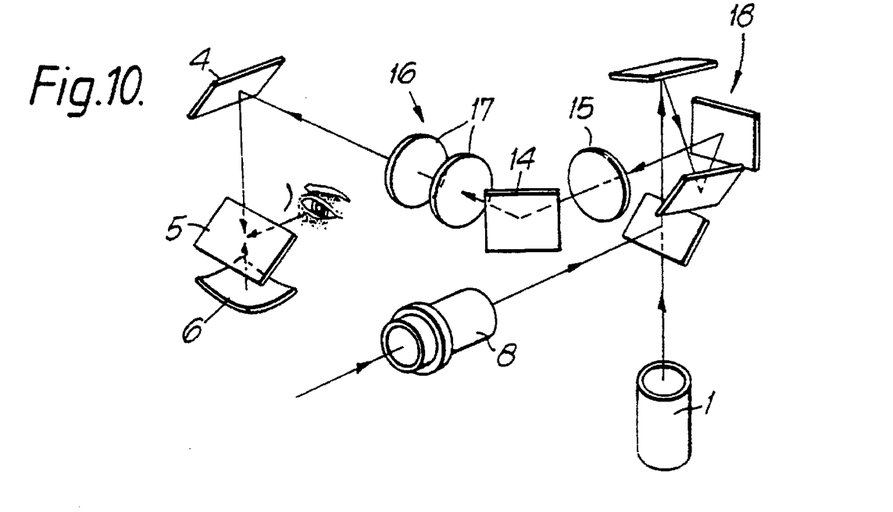

The embodiment illustrated in FIGS. 5, 6 and 7 can be modified to reduce the forward protrusion of the intensifier optics, and three variants of this modification are illustrated in FIGS. 8, 9 and 10. The principal feature is the provision of an additional mirror/combiner mounted on the side of the helmet. As before, a number of alternative combinations of single, double and triple mirrors may be used to generate a correctly-orientated final image, although in general the variants of FIGS. 9 and 10 are preferred because the double mirror unit 13 of the FIG. 8 variant is likely to affect look-up capability.

A general disadvantage of this embodiment is the longer path length from the image intensifier to the relay lens, which makes a wide field of view more difficult to achieve. The interpositioning of one mirror element 14 between lens groups 15 and 16 of the relay unit 17 enables some increase in field of view to be achieved without recourse to a second relay unit for providing a second intermediate image.

Other possible arrangements providing a recessed intensifier tube include the use of one element of the triple mirror unit 18 of the FIG. 10 variant doubling as the combiner, or the use in the NVG of a right angle, Petzval-type objective before the image intensifier.

An alternative arrangement includes, at the expense of a small increase in weight, a solid block or prism to replace several mirrors. This configuration would assist the achievement of a large field of view within constraints imposed by the required image vignetting characteristics across the exit pupil, resulting from the change in ray paths because of the higher refractive index and shorter effective optical path length within a solid block.

As an alternative configuration for use if a CRT is not required, the forward projection of the NVG can be reduced by the use of a right angle objective. This could also be employed in conjunction with a narrow-field (up to about 20°) sight for which a short, narrow-neck CRT may be mounted transversely under the helmet brow.

Figure 11:
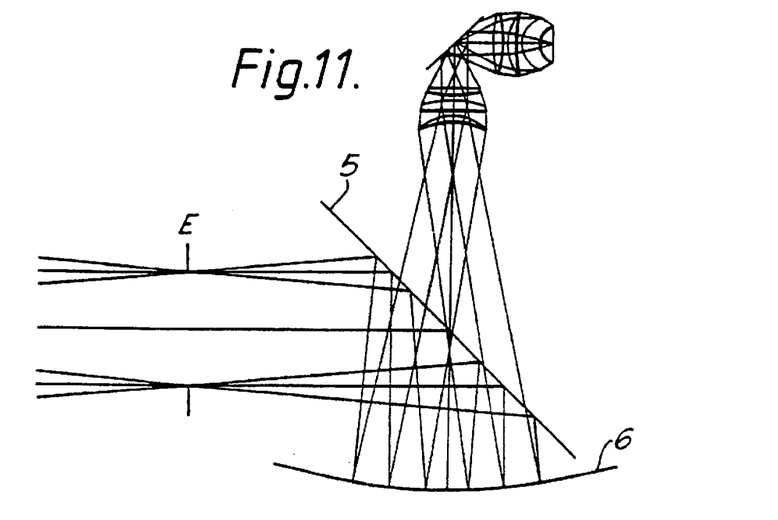
FIG. 11 is a schematic ray diagram of a narrow field optical system suitable for integration into a helmet-mounted display system.

The ray diagram shown in FIG. 11 illustrates the optical features of a narrow field (eg weapon aiming) sight which can be incorporated into a system according to the present invention.

A head-mounted sight of this nature does not require a large optical field and is therefore much easier to implement than wide-field requirements. Typically, a 7° to 12° monocular field is sufficient, and several schemes for fast-jet application have been described.

In the embodiment illustrated in FIG. 11, an intermediate image of the screen of a small CRT mounted across the helmet brow is formed relatively close to the first optical group 19 of a relay lens, thus achieving a large (20 mm diameter) exit pupil from relay elements having a smaller diameter. In the system illustrated, the ratio $d_p/d_r$ (see FIG. 3) is approximately 1.6, an unusually large value which is an important advantage when compared with existing schemes. The CRT screen size has been set to 6 mm, for which a spot size of about 34 um represents 1 mrad in the collimated image and a useful reduction in overall length becomes feasible.

The invention makes it possible for the viewer to avoid having to align his helmet with a target object. Instead, a compatible eye position sensor can be employed to determine the direction in which the eye is pointing, allowing a more natural combination of head and eye movement with more effective target acquisition in a vibrating environment, because of lower eye inertia.

Figure 12:
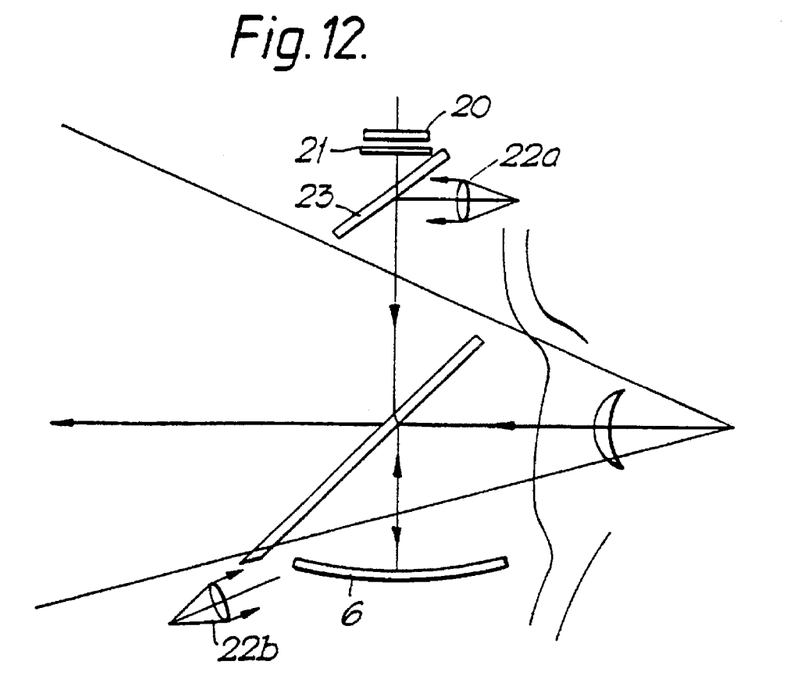
FIG. 12 is a schematic vertical section of a combiner/collimator assembly illustrating the basic optical arrangement of an eye sensor.

Eye sensors, or "eye trackers", are relatively simple optical systems which have been used in a variety of physiological experiments. The present invention makes it possible to incorporate an optical system for an eye sensor which is compatible with the head-up display system, ie using a main imagine mirror located to one side of the viewer's external field of view and a matrix array sensor on the opposite side. FIG. 12 illustrates such a general arrangement.

The eye sensor consists of a CCD TV camera chip 20 placed above the assembly and behind a filter 21 which excludes visible light from the camera, and a miniature diode light source. The camera is located in the plane containing an image of the eye cornea and pupil, as produced by the collimator mirror 6. Two alternative positions of the light source are possible; either the light from the source designated 22a in FIG. 12 is directed onto the optical axis of the TV camera by means of a partial mirror 23 and hence generates a bright-pupil reflection, or the source designated 22b is arranged to illuminate the eye from an off-axis position in order to generate a dark-pupil reflection.

Whilst the use of a TV camera with IR light to produce an image of the eye pupil is well known, this is usually carried out with a relatively simple optical system having only this purpose. This embodiment however makes use of a collimator/combiner assembly which is compatible with the main configuration and hence forms a compact optical system in which both functions co-exist for at least one of the observer's eyes.

Figure 13:
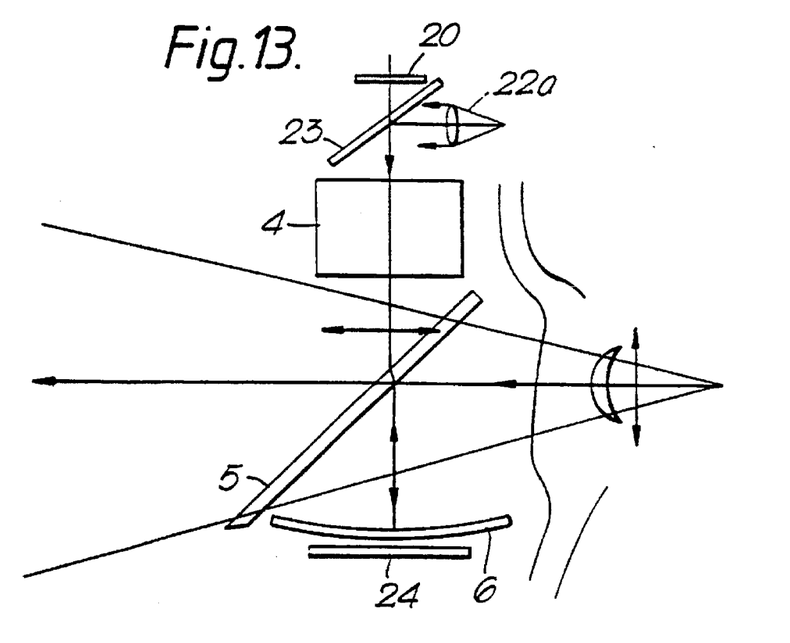
FIG. 13 is a similar section illustrating the incorporation of such a sensor into a wide field head-up display system.

FIG. 13 illustrates the integration of this concept into a wide-field display system. The sensor 20, light source 22a and combining mirror 23 are located above the planar mirror 4. An additional mirror 24 is provided underneath the collimator 6 to reflect the collimated light from the light source towards the combiner 5 and hence the eye, and then back towards the sensor 20. The light source and mirror may be mounted transversely (ie across the forehead) and the positions of sensor and light source are interchangeable. Alternatively, an on-axis diode illumination may be inserted through the display relay lens, or the dark pupil mode may be used (in a manner similar to the use of source 22b of FIG. 12).

The method of operation of the sensor, using high-speed image processing of the camera output, does not form part of the present invention, but it is possible to differentiate between a lateral shift of the eye relative to the optical system and a rotation of the eyeball. The direction in which the eye is pointing can therefore be determined.

As described, the optical requirements for the wide-field display dictate the focal length of the collimator. In practice therefore additional features may be needed to optimise the eye sensing arrangement. FIGS. 14a, 14b, 14c and 14d consist of basic ray diagrams illustrating four possible such arrangements.

Figure 14A:
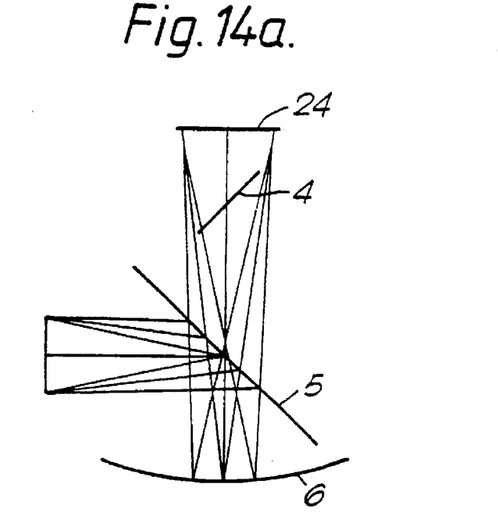
FIGS. 14a, 14b, 14c and 14d are simplified ray diagrams respectively illustrating different optical configurations of the eye sensor.
Figure 14B:
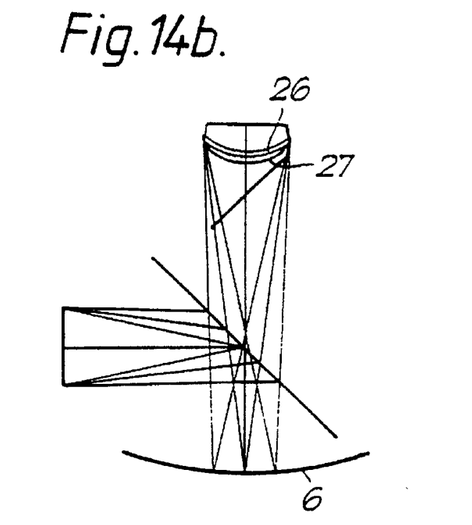

In the arrangement illustrated in FIG. 14a, the existing collimator concave mirror 6 forms an image of the eye in a plane 24 above the existing planar mirror 4. By the addition of two lenses 26, 27 as shown in FIG. 14b, the image magnification or position can be changed over a limited range. In the illustration, the magnification has been set to unity and the image field curvature has been compensated.

Figure 14C:
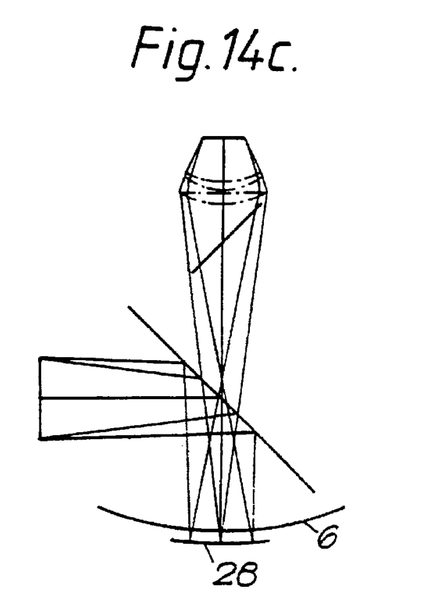

FIG. 14c illustrates the use of an additional concave mirror 28 located beneath the main collimator mirror 6. If the additional mirror 28 has a longer radius of curvature than the collimator mirror, then the size of the eye image at the CCD sensor can be reduced, as shown by the ray diagram.

If the mirror 28 has a smaller diameter than the main mirror 6, then a greater depth of focus is provided for the IR optical system, at the expense of a poorer signal/noise ratio. For designs which use the same curvature for the IR and the display mirrors, then it is possible to bond the mirrors together, or coat the IR mirror onto the main mirror.

If the IR source is narrow-band (such as that provided by a miniature semi-conductor laser, then a non-conformal powered hologram tuned to the IR source frequency may be formed on the display collimator mirror.

Figure 14D:
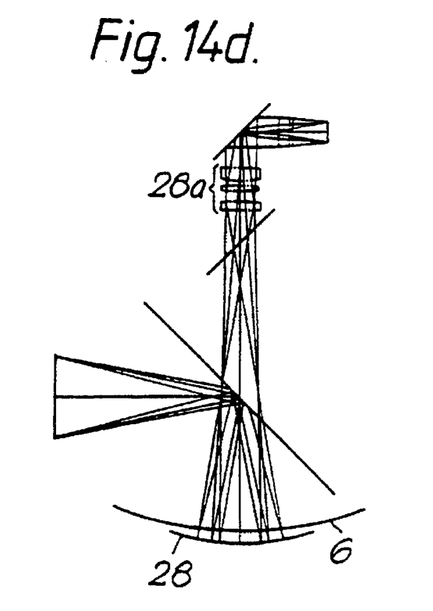

A more flexible design arrangement, illustrated in FIG. 14d, incorporates a relay lens 28a for focusing an intermediate image of the eye on to the COD array. A wider control of image magnification is possible using this arrangement—for example M=0.25 in the example illustrated—but if because of space and weight constraints the use of a very small COD is necessary, then the focal length of the mirror 28 should be relatively short.

To increase the effectiveness of the eye position sensor in daylight, the signal-to-noise ratio should be as great as possible and as much ambient light as possible should be rejected. An improved rejection of ambient light is obtained by the use of a dual-waveband collimating mirror which only reflects a narrow waveband of display light and an additional narrow band of infra-red light (the two reflecting surfaces having the same or a different radius of curvature).

A further improvement is gained by additional rejection of the IR content in ambient sunlight; this can be achieved by an optimised combination of absorption and interference filters within the optics of the eye sensor. An IR source with a small spectral spread is required, but the sensitivity of the COD camera, the use of an image intensifier and the permissible intensity of eye illumination by the IR source set practical limits to the signal-to-noise level achievable by this means.

Other possible techniques for operating with low signal-to-noise ratios include the use of pulsed sources, with or without sequential coding over several fields, or the use of a number of discrete IR sources having a known positional relationship.

The helmet-mounted display system as described may be applied to a single eye as a monocular facility, but as mentioned, two "mirror image" assemblies can be combined for binocular viewing. Good optical accuracy is required for this in view of the need for the outside scene and the "head down" instrumentation to be viewed through the optical surfaces without distortion.

A quite severe specification must be applied for binocular disparity, in order to avoid double imaging in the overlap portions of the display, especially if the system is required to provide a stereo depth perception. These double image and disparity problems in the overlap zone are a major reason for the choice of the collimator/plane combiner arrangements illustrated in FIG. 2. The planar combiner, besides generating lower outside-world distortion, suffers less from the double imaging problems discussed above.

Figure 15:
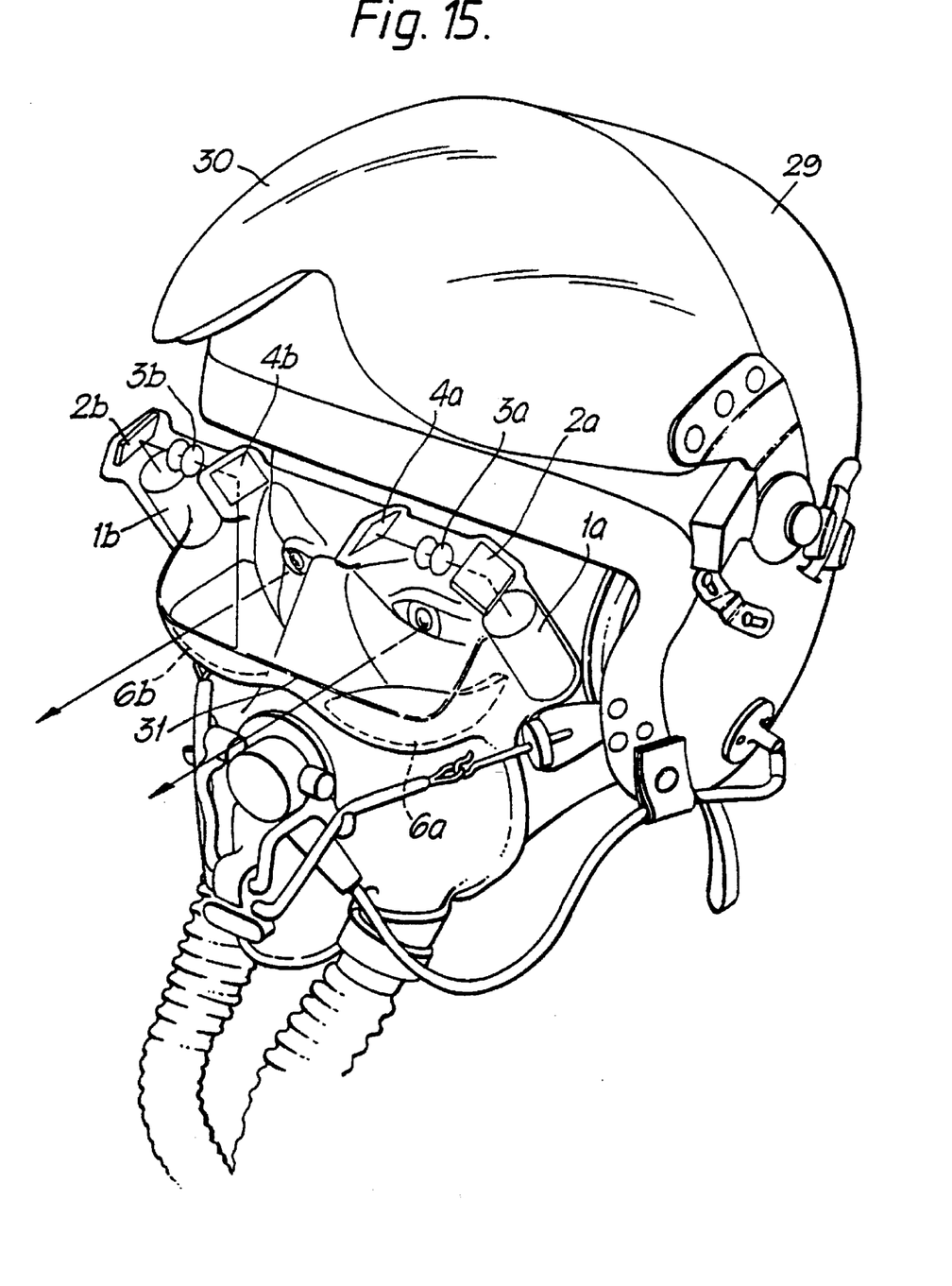
FIG. 15 is a perspective view of a binocular display system based on a single planar combiner and mounted on a helmet.

One means of reducing double imaging and to enhance the rigidity of the optical system is to provide a single, continuous, plane combiner for both eyes, as in the system illustrated in FIG. 15. This figure illustrates, partly schematically, a binocular display system incorporated on to a typical modem helmet 29 and configured so as not to foul the operation of a helmet visor 30.

The assembly illustrated is based on matching left and right eye versions of the system described above with reference to FIG. 1, in which the display light from CRTs 1a, 1b is reflected at plane mirrors 2a, 2b to relay units 3a, 3b respectively.

The light passes through the relay units to inclined mirrors 4a, 4b and then through different regions of a single planar, holographic combiner 31. The combiner is in this example formed as a precision flat plate mounted in a transparent rigid moulding retaining in its lower section two separate collimators 6a, 6b.

The use of a continuous plane combiner, with no other elements in the external field-of-view, removes the distractions and external-world distractions which are obvious at the edges of the discrete optical elements in most types of helmet-mounted displays. In the configurations described, support frames for the optical elements are all absent in the external field-of-view.

The lack of obstruction imposed on the observer's external view by the combiner/collimator arrangement is clearly apparent. Perhaps less clear from the illustration is the efficient rejection by the use of this arrangement of external sunlight and unwanted, spurious reflections—especially (as mentioned above) by the use of an axial collimator arrangement.

There is, moreover, an important structural benefit because the assembly offers a rigid base on which to mount integrated display facilities. A robust and lightweight method for lateral adjustment to take account of inter-ocular spacing can, for example, be implemented by precision mounting strips along the top and bottom of the planar combiner, with discrete pinned fixing positions for the collimators below, and the relay assemblies above, the combiner.

It should be noted that an eye sensor need only be applied to one eye; the small look-up field obstruction due to the sensor optics is not important since there is no corresponding obstruction to the other eye. Likewise, a narrow field sight (see FIG. 11) need only be applied to one eye, which may or may not be the same eye to which the eye sensor is directed.

Figure 16:
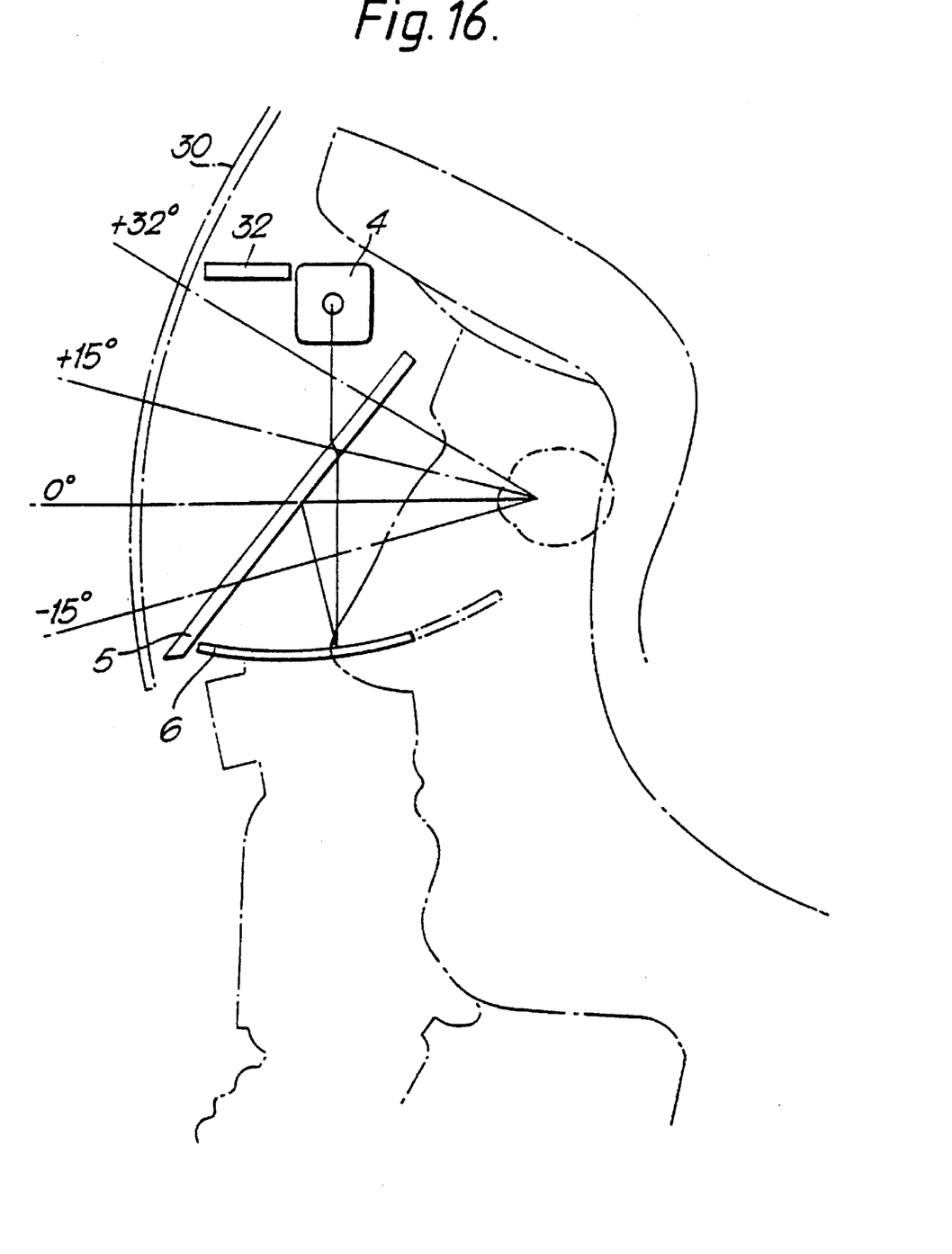
FIG. 16 is a lateral schematic diagram illustrating the integration of the combiner/collimator assembly with a helmet visor.

As mentioned above, the optical system can be configured so as not to foul the helmet visor. One possible relationship between the optical system and the visor operation is shown in FIG. 16. It should be noted that a sun shield 32 may be required to shield the collimator from overhead sunlight.

If the visor 30 has a concave inner surface, as shown in FIG. 16, then to reduce sunlight reflection problems from this surface, the curvature as seen in plan view should have a fairly short radius and be centred along a vertical plane between the eyes (as in a standard helmet). The removable visor, when lowered, meets the sloping outer cover of the upper optical assembly, forming strong physical protection which is continued upwards by the helmet shell.

Some shaping of the visor and the continuous plane combiner is required at the lower side edges of the assembly to ensure a satisfactory fit without placing the visor too far forward (the use of planar sections is preferable in order to reduce outside-world distortion). This structure offers scope for the addition of laser rejection filters and for improved compatibility with PLZT shutters as proposed for nuclear flash protection.

Figure 17:
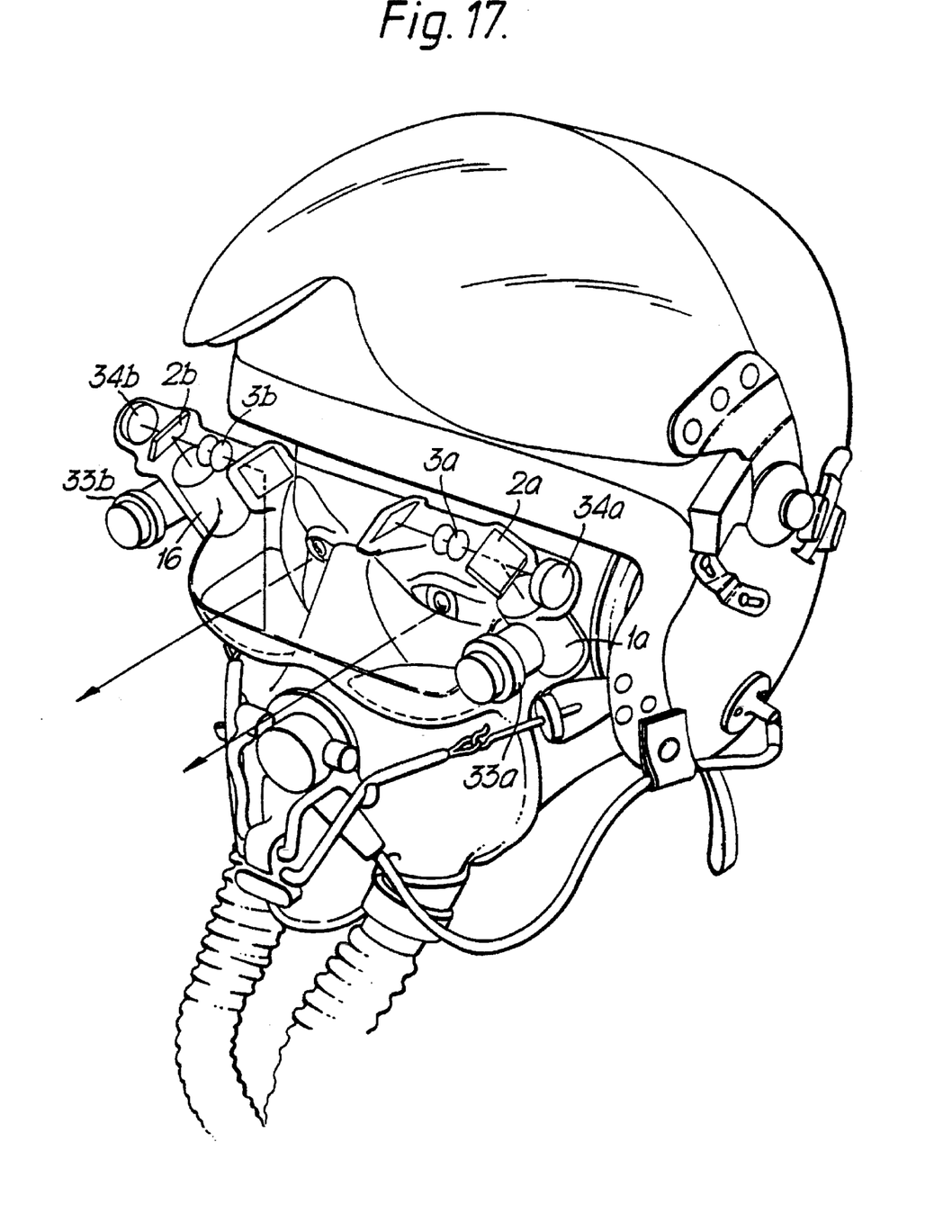
FIG. 17 is a perspective view of a binocular system, similar to FIG. 15 but incorporating means for the optical integration of two different electronic display sources.

A further development of the system is illustrated in FIG. 17, in which the displays from two separate systems are generated electronically and combined optically. In the figure, which is a similar perspective to FIG. 15, the light from CRTs 1a, 1b is reflected, as before, at inclined plane mirrors 2a, 2b towards relay units 3a, 3b respectively. This embodiment includes in addition two NVG image intensifiers 33a, 33b, the outputs from which are processed electronically and fed to respective display screens 34a, 34b. These may, for example, be small matrix displays of low brightness.

In this embodiment, the mirrors 2a, 2b are partially reflecting and the screens are located in the optical axis of the relay units 3a, 3b so that light from the screens is superimposed on the light from the CRTs. The processing used to relay the intensifier output to the screens 33a, 33b can include means for adjusting the brightness and orientation of the images so that they are visually compatible with one another but otherwise the displays can have different pixel densities and line standards, with less aliasing than if all the information is combined electronically in a single CRT.

This embodiment moreover has less weight and greater mechanical design flexibility than the full optical mixing embodiments illustrated in FIGS. 5, 6 and 7.

I claim:

1. An optical system mounted on a helmet for superimposing a collimated image of a display object on an external view of the helmet's wearer, said system comprising:

display object means mounted on the helmet for generating a display;

a collimator having the function of a concave mirror for collimating light from said display;

an optical relay unit located in the forehead region of said helmet for generating an intermediate image of said display in the focal plane of the collimator;

a reflecting surface for reflecting display light from the relay unit towards the collimator; and an inclined combiner, essentially transparent to incoming display light and to the wearer's external view, for reflecting display light reflected from the collimator towards the viewer's eye, the collimator being located outside the wearer's external view through the combiner and being located on the opposite side of said external view with respect to the optical relay unit said system including two substantially identical but relatively reversed systems, one for each eye, and employing a common, planar, diffractive combiner.

2. An optical system according to claim 1 in which the combiner and collimator are arranged in a quasi-axial configuration.

3. An optical system according to claim 1 including at least one additional reflecting surface to re-orient the head-up image.

4. An optical system according to claim 1 including means for enabling the images on two different display object means to be superimposed on one another.

5. An optical system according to claim 1 including means for enabling the images on two different display object means to be superimposed on one another, including at least one partially reflecting surface so that the light from one display object means is reflected at said surface and light from the other object means is transmitted through said surface.

6. An optical system according to claim 5, in which said partially reflecting surface is a reflector in which the selective waveband of reflection changes with angle of incidence.

7. An optical system according to claim 1 incorporating an eye sensor for detecting the direction in which the wearer's eyes are pointing.

8. An optical system according to claim 7 in which the eye sensor comprises an infra-red light source for illuminating one of the wearer's eyes, and a concave reflecting surface located essentially coincident with the collimator for focusing the infra red light reflected off the eye on to a detector located generally above the combiner.

9. An optical system according to claim 7 in which the eye sensor comprises an infra-red light source for illuminating one of the wearer's eyes, and a narrow-band infra-red reflecting coating on the collimator for focusing the infra red light reflected off the eye on to a detector located generally above the combiner.

10. An optical system mounted on a helmet for superimposing a collimated image of a display object on an external view of the helmet's wearer, each system comprising:

display object, mounted on the helmet, providing a light image;

a collimator having the function of a concave mirror for collimating light from said display;

an optical relay unit, located in the forehead region of said helmet, for generating an intermediate image of said display in the focal plane of the collimator;

a reflecting surface for reflecting display light from the relay unit towards the collimator; and an inclined combiner, essentially transparent to incoming display light and to the wearer's external view, for reflecting display light reflected from the collimator towards the wearer's eye, the collimator being located outside the wearer's external view through the combiner and being located on the opposite side of said external view with respect to the optical relay unit, said system including two substantially identical but relatively reversed systems, one for each eye, and employing a common, planar, diffractive combiner.

11. An optical system mounted on a helmet for superimposing a collimated image of a display object on an external view of the helmet's wearer, said system comprising:

display object means mounted on the helmet for generating a display;

a collimator having the function of a concave mirror for collimating light from said display; and an inclined combiner, essentially transparent to incoming display light and to the wearer's external view, for reflecting display light reflected from the collimator towards the wearer's eye, the collimator being located outside the wearer's external view through the combiner, said system including two substantially identical but relatively reversed systems, one for each eye, and employing a common, planar, diffractive combiner.

12. An optical system according to claim 11, including an optical relay unit located in the forehead region of said helmet for generating an intermediate image of said display in the focal plane of the collimator and a reflecting surface for reflecting display light from the relay unit towards the collimator, wherein the collimator is located on the opposite side of said external view with respect to the optical relay unit.

13. An optical system according to claim 11 including at least one additional reflecting surface to re-orient the head-up image.

14. An optical system according to claim 11 including means for enabling the images on two different display object means to be superimposed on one another.

15. An optical system according to claim 11 including means for enabling the images on two different display object means to be superimposed on one another, including at least one partially reflecting surface so that the light from one display object means is reflected at said surface and light from the other object means is transmitted through said surface.

16. An optical system according to claim 15 in which said partially reflecting surface is a reflector in which the selective waveband of reflection changes with angle of incidence.

17. An optical system according to claim 11 incorporating an eye sensor for detecting the direction in which the wearer's eyes are pointing.

18. An optical system according to claim 17 in which the eye sensor comprises an infra-red light source for illuminating one of the wearer's eyes, and a concave reflecting surface located essentially coincident with the collimator for focusing the infra red light reflected off the eye on to a detector located generally above the combiner.

19. An optical system according to claim 17 in which the eye sensor comprises an infra-red light source for illuminating one of the wearer's eyes, and a narrow-band infra-red reflecting coating on the collimator for focusing the infra red light reflected off the eye on to a detector located generally above the combiner.

20. An optical system mounted on a helmet for superimposing a collimated image of a display object on an external view of the helmet's wearer, each system comprising:

display object, mounted on the helmet, providing a light image;

a collimator having the function of a concave mirror for collimating light from said display; and an inclined combiner, essentially transparent to incoming display light and to the wearer's external view, for reflecting display light reflected from the collimator towards the wearer's eye, the collimator being located outside the wearer's external view through the combiner, said system including two substantially identical but relatively reversed systems, one for each eye, and employing a common, planar, diffractive combiner.

* * * * *